United States Patent
Hofstedt

(10) Patent No.: US 9,719,048 B2
(45) Date of Patent: Aug. 1, 2017

(54) METHOD AND ARRANGEMENT FOR THE SEPARATION OF TALL OIL PRODUCTS FROM BLACK LIQUOR

(71) Applicant: Anders Goran Hofstedt, Linkoping (SE)

(72) Inventor: Anders Goran Hofstedt, Linkoping (SE)

(*) Notice: Subject to any disclaimer, the term of this patent is extended or adjusted under 35 U.S.C. 154(b) by 0 days.

(21) Appl. No.: 14/778,384

(22) PCT Filed: Mar. 20, 2014

(86) PCT No.: PCT/SE2014/050346
§ 371 (c)(1),
(2) Date: Sep. 18, 2015

(87) PCT Pub. No.: WO2014/148996
PCT Pub. Date: Sep. 25, 2014

(65) Prior Publication Data
US 2016/0281028 A1  Sep. 29, 2016

(30) Foreign Application Priority Data
Mar. 20, 2013  (SE) .................................. 1300213

(51) Int. Cl.
C11B 13/00   (2006.01)
D21C 11/00   (2006.01)
C11B 13/02   (2006.01)

(52) U.S. Cl.
CPC ........ C11B 13/005 (2013.01); D21C 11/0007 (2013.01); C11B 13/02 (2013.01); Y02W 30/74 (2015.05)

(58) Field of Classification Search
None
See application file for complete search history.

(56) References Cited

U.S. PATENT DOCUMENTS

| 2,200,468 A | 5/1940 | Cirves |
| 2,838,481 A * | 6/1958 | Sullivan ................. C11D 15/00 530/208 |
| 2012/0296066 A1 | 11/2012 | Hofstedt |

FOREIGN PATENT DOCUMENTS

| EP | 1 694 909 | 8/2006 |
| WO | 92/13804 A1 | 8/1992 |
| WO | 2005/059242 A1 | 6/2005 |

OTHER PUBLICATIONS

Goble, A.J., Self-cleaning centrifuge improves CTO separatin efficiency, yields, Nov. 1980, Pulp & Paper, pp. 147-150, (7 pages b/c clarity).*

(Continued)

*Primary Examiner* — Yate K Cutliff
(74) *Attorney, Agent, or Firm* — Young & Thompson

(57) ABSTRACT

A method and arrangement for separating tall oil products from a black liquor-containing boiling liquid that has been drained off, was produced within a kraft mill chip digester, and includes a fibrous cellulose material in a mixture with the black liquor and tall oil products, and where the boiling liquid is separated in a separation unit arranged to mechanically separate the boiling liquid into a fibrous cellulose material and a mixture of mixed black liquor and tall oil products, where the mixture of boiling liquid and tall oil products is brought to a separation tank, the separation tank being a gravity separation tank, and adapted to be emptied in a discontinuous manner of the tall oil product collected and concentrated therein, the tall oil products being floated on top of and above a fraction of mixed black liquor, where the tall oil products is brought to a centrifugal separator.

12 Claims, 2 Drawing Sheets

(56) References Cited

OTHER PUBLICATIONS

Drew J. "Maximizing tall oil recovery". Extract from Chemical engineering progress 72(6):64(1976); the whole document,especially the first three paragraphs under the headline "Weak liquor storage & evaporation" on p. 68.
International Search Report, dated Jul. 1, 2014, from corresponding PCT Application.
Derk, "Tall Oil," Kirk-Othmer Encyclopedia of Chemical Technology, pp. 1-7.

* cited by examiner

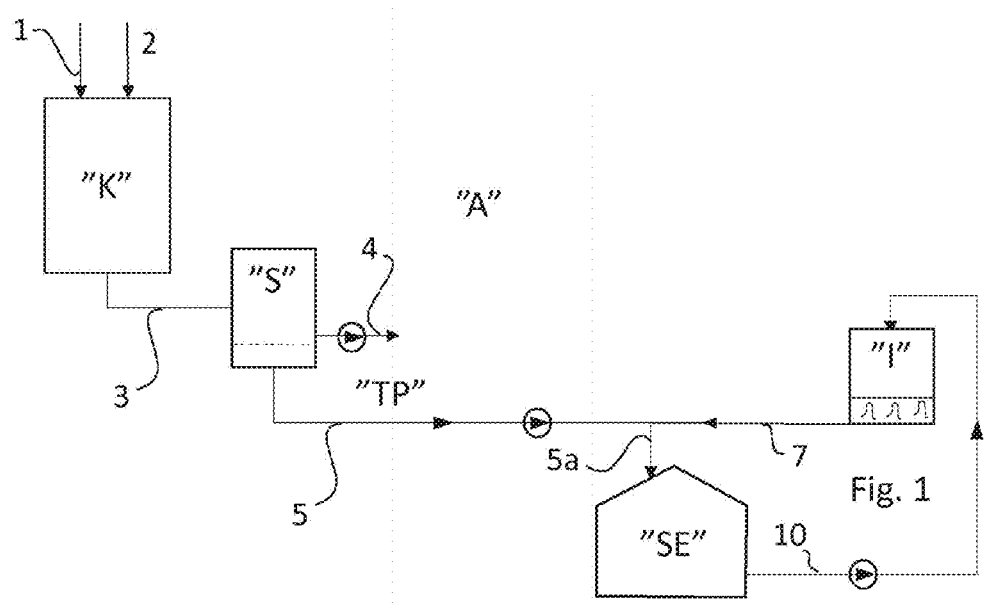
Fig. 1
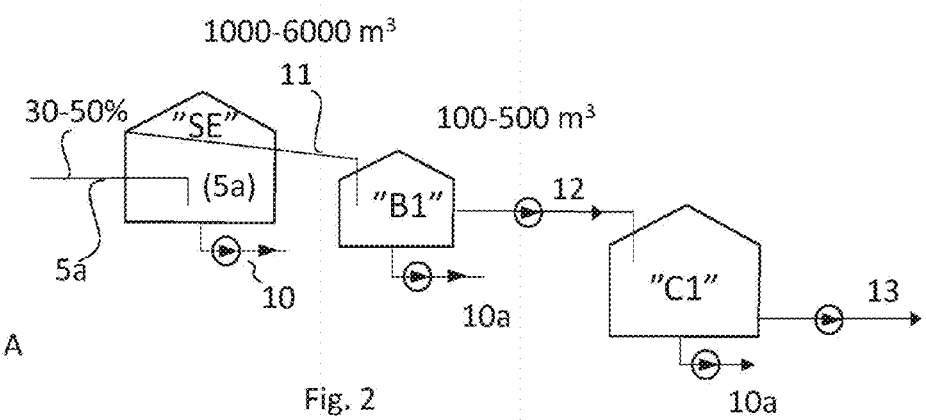
Fig. 2
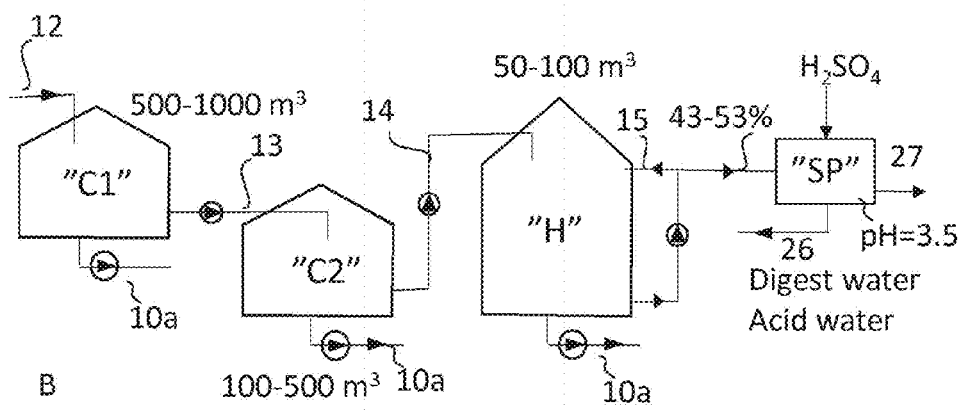

METHOD AND ARRANGEMENT FOR THE SEPARATION OF TALL OIL PRODUCTS FROM BLACK LIQUOR

TECHNICAL FIELD OF THE INVENTION

This invention generally relates to a method and an arrangement for the separation of tall oil products (soap products) from a black liquor-containing cooking liquid, produced in a kraft mill chip digester.

The cooking liquid from such an application will contain or comprise a fibrous cellulose material in a mixture with said black liquor and its tall oil products or tall oil soap products.

The boiling liquid will be brought to a mechanical separator unit which allows the mechanical separation of fibrous cellulose material from a more viscous mixture of black liquor and tall oil products, where the viscous mixture is brought to a separation tank after the addition of intermediate liquor to form a mixed black liquor, where the separation tank is using gravity separation.

This separation tank shall, firstly, be adapted for being emptied in a discontinuous manner of gravity-concentrated tall oil products (soap) gathered therein, which by flotation will be placed above a black liquor or mixed liquor fraction. The thus concentrated tall oil products can be brought to a centrifugal separator through a de-soaping or skimming procedure in a known manner.

The present invention has, as it foremost purpose, to allow the simplification of the production of tall oil products or tall oil soap products that are largely free of black-liquor and/or of mixed black liquor and extracted from black liquor, and to offer, in relation to the prior art according to FIGS. 1 and 2, a simpler method and arrangement, where large tanks for gravity separation of tall oil products from black liquor or mixed black liquor in the form of buffer soap, can be eliminated.

BACKGROUND OF THE INVENTION

Several embodiments of methods, arrangements and plants relating to the above-mentioned technical field and with a function and nature that meets requirements are previously known.

Thus, different methods and arrangements are known for the separation of tall oil products (soap products) from a drawn off black-liquor containing boiling liquid, with very small fractions of tall oil products.

The boiling liquid is produced within a kraft mill digester where the abovementioned boiling liquid comprises a fibrous cellulose material in a mixture with the mentioned black liquid with tall oil products.

The boiling liquid shall primarily be brought to a mechanical separator unit, a sieve, in which solid fibrous cellulose material can be separated from a more viscous mixture of black liquor and tall oil products.

The thus separated fibrous cellulose material is brought to a plant for the production of paper pulp.

The viscous mixture of black liquor and tall oil products is brought, after addition of intermediate liquor to form mixed black liquor, to a separation tank that uses gravity separation, adapted to use gravity to separate tall oil products in the mixed black liquor from the mixed black liquor, said separation tank being adapted for being discontinuously emptied of collected and gravity-separated tall oil products, the tall oil products being positioned above and floating on a mixture of black liquor or mixed black liquor, and where the mentioned thus tall oil products which have been separated by gravity, directly or indirectly shall be brought to a centrifugal separator.

A previously known method and associated arrangement is shown in the attached drawings where FIG. 1 illustrates the principles for a part of the arrangement in a kraft mill with a chip digester and an attached mechanical separator unit, for the separation of a fibrous cellulose material (fibers) from the boiling liquid (black liquor and small amounts of tall oil products).

FIG. 2 illustrates the part of the known arrangement where a mixed black liquor is treated to allow separation the tall oil products, which comprise a small volume, from black liquor or mixed black liquor and other rest products.

FIG. 1 and FIG. 2 will be discussed in detail below.

Prior art also comprises a method comprising tanks for separating mixed black liquor, where the mixed black liquor is continuously supplied and where the tall oil products and the black liquor and mixed black liquor is, through gravity separation, continuously drawn off.

Prior art also comprises a method comprising tanks separating mixed black liquor, where the mixed black liquor is discontinuously supplied and where the tall oil products and the black liquor and mixed black liquor is, through gravity separation, discontinuously drawn off.

The drawing off of tall oil products somewhat mixed with the mixed black liquor is done from the top portion of the tank while the drawing off of mixed black liquor is carried out from the lower portion of the tank.

The current invention is based on the discontinuous separation of mixed black liquor and an arrangement adapted for that method.

Prior art also comprises the use of a centrifugal separator which can be supplied with gravity separated tall oil products comprising small amounts of black liquor or mixed black liquor, where the tall oil products (soap), by having different densities, can be efficiently separated from black liquor and mixed black liquor and their contaminations.

The article "Maximizing tall oil recovery", Drew J, Chemical engineering progress 72 (5):64 (1976) describes a method for the separation of tall oil from boiling liquid.

US2012296066 describes a method for the separation of tall oil with the aid of a centrifugal separator.

DESCRIPTION OF THE CURRENT INVENTION

Technical Problem

The following technical problems may be relevant for the following invention, taking into consideration the technical consideration that a person skilled in the art must make.

Considering the prior art, as described above, is should be considered a technical problem to realize the importance of, the advantages associated with and/or the technical measures and considerations needed to allow the removal of large buffer tanks, said buffer tanks intended for an increasingly purified buffer soap, for the purpose to, through gravity separation, repeatedly in serial process steps, allow the draining off of the soap from the black liquor and the mixed black liquor and produce the purest possible tall oil product and considerably shorten the needed treatment times, usually in the order of 3 to 4 weeks.

There is a technical problem in realizing the need for, the advantages associated with and/or the technical measures and considerations required for pointing out a method and an arrangement that turns out to need less tanks, that will offer "purer" tall oil products (with even less mixed black liquor mixed therein), than the prior art.

There is a technical problem in realizing the need for, the advantages associated with and/or the technical measures and considerations and measures needed for substantially decreasing the needed process times between a separation tank and a final homogenization tank, before the tall oil products is brought to a digestion facility, and which will provide a higher quality (higher acid value) for the thus treated tall oil products as produced raw tall oil products.

There is a technical problem in realizing the need for, the advantages associated with and/or the technical measures and considerations and measures needed to allowing to offer less addition of acid in a digestion facility, in order to allow the digestion of more concentrated tall oil products, such as more than or equal to 60 weight % of raw tall oil in relation to tall oil product and recover even less rest products such as acid water, precipitated lignin and salts.

There is a technical problem in realizing the need for, the advantages associated with and/or the technical measures and considerations and measures needed to present a method and an arrangement, for the separation and concentration of tall oil products (soap products) from a black liquor-containing boiling liquid that has been drained off, said boiling liquid having been produced within a kraft mill chip digester, where said boiling liquid comprises, on one hand, a fibrous cellulose material in a mixture with the aforementioned black liquor and tall oil products, and where the boiling liquid, within a separation unit, is mechanically separated into a fibrous cellulose material and a mixture of black liquor and tall oil products, where the mixture of black liquor and tall oil products, after addition of intermediate black liquor, is brought to a separation tank using gravity separation as mixed black liquor, here adapted for being discontinuously emptied of collected and gravity-concentrated tall oil products, which through a flotation will be positioned above and resting on a black liquor- or mixed black liquors fraction and where the said concentrated tall oil products directly and simply can be fed to a centrifugal separator and that in such a method and arrangement allow the aforementioned gravity-separated tall oil products (soap) with its limited (black liquor- or) mixed black liquor content be brought the aforementioned centrifugal separator which is adapted to, through centrifugal forces concentrate the tall oil products so that these are present in a solid "sausage"-like form.

There is a technical problem in realizing the need for, the advantages associated with and/or the technical measures and considerations and measures needed in choosing the form with such a solid and hard structure that it not directly, or only with difficulty, can be pumped, where this form, with its rheological properties, must otherwise be adapted to be diluted with, and mixed with, water, in order to thereby exhibit a form that can be pumped with lower rheological properties than the solid structure needed to be pumped to a tank.

There is a technical problem in, for this method and an associated arrangement, efficiently taking into consideration that the more solid form and higher rheological properties that can be assigned to the tall oil products, the less and more compact the black liquor and mixed black liquor content, which for practical purposes means less use of acid in the following digestion process in the digestion facility in which the added tall oil products (soap) shall be digested into raw tall oil and, among other things, acid water.

There is a technical problem in realizing the need for, the advantages associated with and/or the technical measures and considerations needed to allow said tank serve as a homogenization tank, without the need for gravity separation.

There is a technical problem in realizing the need for, the advantages associated with and/or the technical measures and considerations needed to allowing the separation tank be adapted to, through addition of an excess of mixed black liquor allow the elevation of the floating concentrated tall oil products, which by said elevation, through a skimmer or similar, can directly flow to a mixing tank, or an initial, a first, homogenization tank with a stirrer, before they, such as through a pumping unit, can be brought to an input for the centrifugal separator.

There is a technical problem in realizing the need for, the advantages associated with and/or the technical measures and considerations needed to allow a volume of added mixed black liquor to the separation tank per time unit be adapted to a chosen solid form and/or rheological properties of the tall oil products downstream or at the output for the centrifugal separator.

There is a technical problem in realizing the need for, the advantages associated with and/or the technical measures and considerations needed to, from a final and second, homogenization tank, allow the feeding of concentrated tall oil products in a mousse- or slurry form and separated from mixed black liquor, to a digestion facility, which through an acid ($H_2SO_4$) with a pH of approximately 3.5, shall be able to form raw tall oil and rest products, such as acid water, etc.

There is a technical problem in realizing the need for, the advantages associated with and/or the technical measures and considerations needed for to, choosing the proportion tall oil products at 50-70%, such as about or above 60 weight % raw tall oil of the tall oil products or soap, as a mixture of concentrated tall oil products and a small part of black liquor or mixed black liquor, downstream of the centrifugal separator.

There is a technical problem in realizing the need for, the advantages associated with and/or the technical measures and considerations needed to allow separated black liquor fractions from the centrifugal separator be fed to the added mixture to the separation tank, alternatively be fed directly to the input of the separation tank or its lower portion.

The Solution

In order to solve one more of the abovementioned problems the following invention more specifically shows that the prior art described in FIGS. 1 and 2 shall be adapted in the following manner.

The current invention thus starts out from the prior art as a method and an arrangement, for the separation of tall oil products (soap products) from a black liquor-comprising boiling liquid that has been drained off, said boiling liquid having been produced within a kraft mill chip digester, where the said boiling liquid comprises a fibrous cellulose material in a mixture with said black liquor and tall oil products and where the boiling liquid is mechanically separated in a separation unit to obtain a fibrous cellulose material and a mixture of black liquor and tall oil products where, after addition of intermediate black liquor, the mixture is brought to a separation tank that is using gravity separation, said separation tank adapted for being emptied in a discontinuous manner. The tall oil products are floated above or on top of a black-liquor or mixed black liquor fraction and the thus concentrated tall oil products with their limited black liquor- or mixed black liquor content is brought to a centrifugal separator and specifically states that said concentrated tall oil products and its black liquor- or mixed black liquor content shall be directly and while being warm shall be brought to said centrifugal separator, which is adapted to, through the generation of centrifugal forces thus concentrate the tall oil products to such a low content of black liquor or mixed black liquor as practically possible, so that the tall oil products will be present in a solid form with high rheological properties and will thus be more solid than a mousse- or a slurry form with corresponding rheological properties, where the initial form advantageously can be chosen to be hard and compressed in the form of a "sausage"-structure and thereby being too hard to be pumped directly and/or simply.

There is a technical problem in realizing the need for, the advantages associated with and/or the technical measures and considerations needed for allowing this form be adapted to be diluted with a small proportion of water for the formation of a form that can be pumped, with lower rheological properties to form a mousse- or slurry form that thus can be pumped to a tank.

The invention specifically discloses that said tank shall be used as a homogenization tank.

The separation tank is furthermore adapted to, by addition of an excess of mixed black liquor, allowing the elevation the collected and concentrated tall oil products within the tank. The tall oil products will by the elevation be allowed to flow through a skimmer or similar arrangement, to a mixing tank or a process-initiating homogenization tank before they, through a pumping unit, can be pumped to an inlet of the centrifugal separator.

The volume of mixed black liquor that is added to the separation tank per time unit can be adapted to suit a predetermined form and/or rheological properties downstream of the centrifugal separator.

Furthermore it is disclosed that concentrated tall oil products are fed from a final homogenization tank, said tall oil products being separated from black liquor and/or mixed black liquor, to a digestion facility, which through the use of an acid ($H_2SO_4$) with a pH of approximately 3.5, allows the formation of raw tall oil and digestion water, and/or acid water, precipitated lignin and salts, as rest products.

The invention further proposes that the proportion of tall oil products, in the mixture of tall oil products and mixed black liquor downstream of the centrifugal separator, shall be chosen to be 50% to 70%, such as around 60 wt %.

The mixed black liquor separated by the centrifugal separator can advantageously be fed to the mixed black liquor being added, alternatively directly to the lower portion of the separation tank.

Advantages

The most prominent advantages that characterizes the current invention and the thus indicated features is the creation of conditions, to, in an arrangement and a method as defined in the non-characterizing portions of claim 1 and claim 8, bring gravity separated concentrated tall oil products with its limited black liquor or mixed black liquor content, to a centrifugal separator, adapted to, through generation of centrifugal forces thus concentrate the tall oil products and limited proportion of black liquor and/or mixed black liquor so that these are present in a solid form and/or somewhat diluted to a mousse or slurry form where the solid form shall be chosen to be as hard as practically possible, usually too hard to be pumped in a simple manner, and that this chosen solid form is adapted to be diluted with water or similar to a form that can be pumped, in order to be directly pumped to a homogenization tank, which is the last step of the process.

The following conditions are created in relation to the prior art:
  a. Buffer soap tanks can be eliminated,
  b. Purer tall oil products can be produced,
  c. Shorter treatment times,
  d. Less lowering of the temperature during processing,
  e. Higher quality of extracted tall oil products and raw tall oil,
  f. Higher acid value in the tall oil products,
  g. Less addition of concentrated acid to the digestion facility thanks to a lower volume mixed black liquor or black liquor,
  h. Produce concentrated tall oil products, which will yield more than approximately 60 wt % raw tall oil from the tall oil products or the soap,
  i. Lower volumes of acid water, precipitated lignin and salts from the digestion plant to take care of.

The most important features of the invention are disclosed in the characterizing portions of claims 1 to 10.

BRIEF DESCRIPTION OF DRAWINGS

The prior art and a proposed embodiment that has the characterizing features of the invention, shall now be described in an example with reference to the attached drawing in which:

FIG. 1 shows, as a schematic block diagram, a part of a known arrangement within a kraft mill and where mixed black liquor is added to a separation tank for gravity separation of concentrated tall oil products from said mixed black liquor, FIG. 2 shows, as a schematic block diagram, a part of a known arrangement for the separation of tall oil products from black liquor or mixed black liquor, that uses two buffer soap tanks and for addition of tall oil products to a digestion facility.

DEFINITIONS

Figure 3:
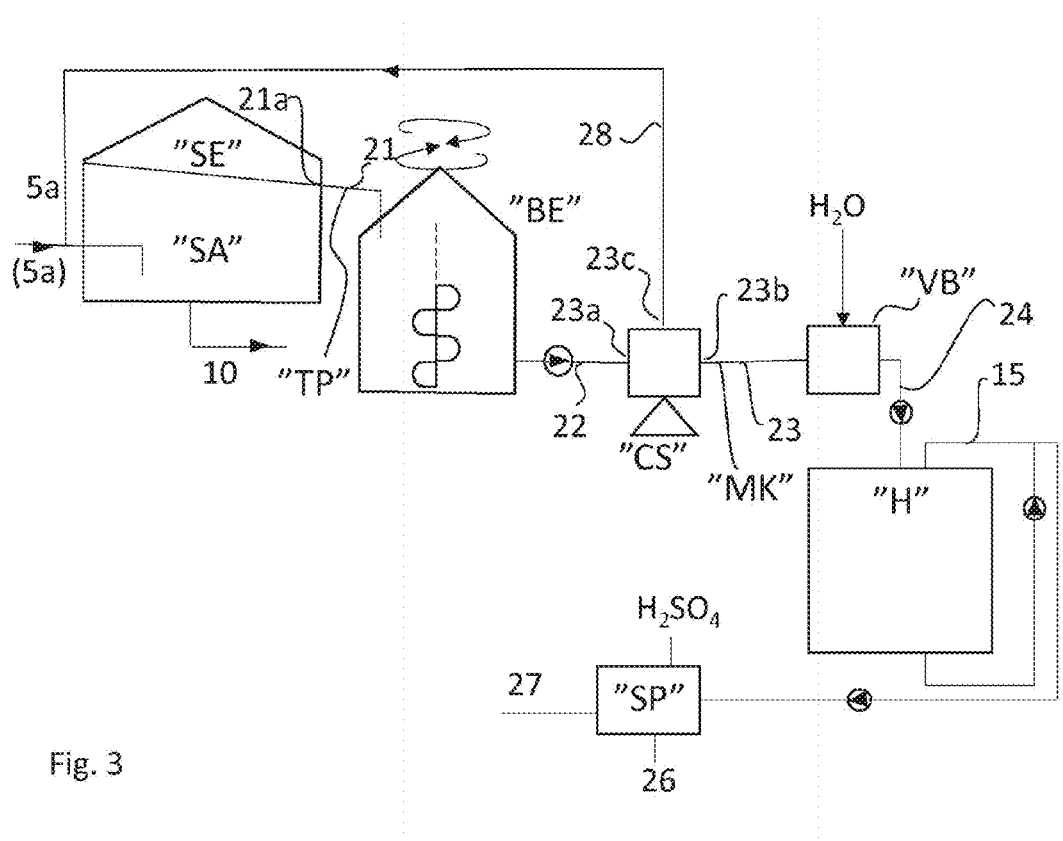
FIG. 3 shows, as a schematic block diagram, a method and an arrangement according the invention, for a stepwise separation and concentration of tall oil products from mixed black liquor through a centrifugal separator and where the two buffer soap tanks of FIG. 2 have been eliminated.

The current invention has as its main task to allow the concentration of a mixture of gravity-separated tall oil products (soap) and black liquor and mixed black liquor fractions mixed therein.

For this purpose, the invention uses a compressing means which in the disclosed embodiment is illustrated by a centrifugal separator.

Said tall oil products and the black liquor or mixed black liquor mixed therein will through this process be available with variable states of compression, where at least the following different grades of compression should be mentioned.
  a) A higher (the highest) state of compression where the included tall oil products (soap) and mixed black liquor mixed therein is in a solid form and as such displays a "sausage"-like structure and shall be considered to display a structure corresponding to a non-viscous fluid.
  b) A lower grade of compression where the included tall oil products (soap) and mixed black liquor mixed therein is present in a mousse- or slurry structure by the addition of water to the highest grade of compression and where this structure is adapted to only with difficulty be pumped with the aid of displacement pumps and similar.

Description of a Prior Art Arrangement According to FIGS. and 1 and 2.

FIG. 1 shows a schematic block diagram of a prior art arrangement "A" within a kraft mill plant, with a chip digester "K".

The chip digester K is fed with wooden chips through a conduit 1 and white liquor through conduit 2 in a manner that is previously known.

Wooden chips and white liquor is then boiled in the chip digester "K", whereupon the boiling liquid is drained off through conduit 3, to a mechanical separator unit "S" in order to separate the fibrous cellulose material, which through a conduit 4, is transported to a plant for the manufacturing of paper pulp.

The separation unit "S" also separates tall oil products mixed with black liquor or mixed black liquor, through a conduit 5.

The boiling liquid, having been separated from the fibers, is now referred to as weak black liquor, passes through conduit 5 and is mixed with intermediate black liquor 7 from an evaporator "I" in order to produce mixed black liquor through conduit 5a.

The mixed black liquor (5a) also contains small amounts of fibrous material which can be concentrated in an evaporator "I" connected to conduit 7.

The mixed black liquor (5a) with approximately 23 wt % tall oil products passes through the conduit 5a to a separation tank "SE".

FIG. 2 part A shows a known part of an arrangement between the separation tank "SE" and a first buffer soap tank "C1" while part B shows a following part of an arrangement between the first buffer soap tank C1 and a connecting and following homogenization tank and a digestion facility "SP".

FIG. 2 parts A and B shows that said separation tank "SE" by way of conduit 11 is connected to a buffer tank "B1" which in turn, by way of conduit 12, is serially connected to the first soap buffer tank "C1" which in turn, by way of conduit 13, is serially connected to a second soap buffer tank "C2", which in turn, by way of conduit 14, is connected to digestion facility "SP" through a homogenization tank "H" and a conduit 15.

The two soap buffer tanks "C1:C2" can be different or identical and with a chosen flow velocity so that the storage time will be in the magnitude of 3 to 4 weeks, with a gravity separation of and concentration of tall oil products (soap) within the top portion of the tanks while a mixed black liquor fraction and its black liquor fraction is collected in the lower portion of the tanks, which is being drained off as waste liquor.

FIG. 2 parts A and B shows certain information regarding volumes and suitable tall oil product weight percentages of the soap.

The present invention is based on, i. a. on the elimination of the two buffer soap tanks in FIG. 2.

DESCRIPTION OF A SUGGESTED EMBODIMENT

The following is a description of a suggested embodiment, which shows the features of the invention. It should initially be pointed out that we have chosen the wording and the terminology of the description in order to make the idea of the invention clear.

However, it should be said that the chosen expressions shall not be considered to be limited to the terminology used herein, but that it shall be understood, that every chosen term shall be interpreted to also include all technical equivalents that work in the same, or essentially the same, manner, in order to achieve the same or essentially the same technical effect.

With reference to the attached FIGS. 1, 2 and 3, but in particular FIG. 3, it is thus shown, schematically and in detail, not only the features of the current invention but also the important peculiarities of the invention.

Thus, FIG. 3 shows, with reference to FIGS. 1 and 2, the presence of a separation tank "SE" serially connected through conduit 21 with a mixing unit "BE" in the form of an initial or first homogenization tank, and which, through conduit 22, is connected to the inlet 23a of a centrifugal separator "CS" which allows the separation of light tall oil products from heavier black liquor or mixed black liquor products 28 and which through a piece of conduit (virtual conduit) 23 brings the tall oil products to a mixer "VB".

Since the form of, and the rheological properties of, the tall oil products which leaves the outlet 23b of the centrifugal separator "CS" in a compressed form, shall be chosen as to be so solid that the tall oil products cannot easily be pumped with the use of ordinary displacement pumps dimensioned for a fluid transport, but must be pumped with a special pump, it is suggested that the outlet 23b of the centrifugal separator is connected directly to the mixer "VB".

The tall oil products are mixed in the mixer with a very small portion of water (not black liquor or mixed black liquor) and are then pumped, through conduit 24, to a finalizing homogenization tank "H" for, as a mousse- or slurry structure, be brought to the digestion facility "SP" in the way indicated according to FIG. 2, part B.

With regard to the method and the arrangement, the invention separates tall oil products (soap products) from a black liquor-containing boiling liquid that has been drained off, said boiling liquid having been produced within a kraft mill chip digester, where said boiling liquid comprises a fibrous cellulose material and a mixture of said black liquor and tall oil products, and where the boiling liquid is mechanically separated in a separator unit "S" into a fibrous cellulose material and a mixture of black liquor and tall oil products, and where the mixture of black liquor and tall oil products, after addition of intermediate black liquor, is brought to a separation tank "SE" where gravity separation takes place, said separation tank being adapted for being discontinuously emptied of collected and gravity-separated tall oil products "TP", which through flotation are positioned above and floating on a black liquor and mixed black liquor fraction "SA", and where said concentrated tall oil products are brought, through conduits 21 and 22 to a means for separating and concentrating tall oil products, here illustrated as a centrifugal separator "CS".

According to the invention described in FIG. 3, said concentrated tall oil products "TP" with a limited content of black liquor or mixed black liquor shall be brought to the inlet 23a of said centrifugal separator "CS", said centrifugal separator being adapted to, through the generation of centrifugal forces, concentrate the tall oil products with its limited fraction of black liquor or mixed black liquor, so that it is available in a solid form or at least a form that is very viscous mousse- or slurry-form "MK" in the conduit part 23.

The form shall be chosen to be so concentrated and hard as is practically possible, usually too hard to be pumped in a simple manner, the form having a high rheological units and can be adapted to be diluted with water or such, to a form that can be pumped, with only slightly lower rheological properties to be able to be pumped to a tank "H".

It is preferred that said tank "H" shall serve only as a homogenization tank with a stirrer.

The separation tank "SE" can then be adapted to, through the addition of mixed black liquor elevate the concentrated tall oil products "TP" which by said elevation can flow to the mixing unit "BE" through a skimmer 21a, before they, by a pumping unit, is pumped to the inlet 23a of the centrifugal separator "CS".

The tall oil products, separated from black liquor and/or mixed black liquor will be fed from said homogenization tank "H" to a digestion facility "SP" which through the addition of an acid ($H_2SO_4$) with a pH of approximately 3.5 will form raw tall oil 27 and acid water, precipitated lignin and salts as rest products 26.

The mixture of tall oil products and black liquor or mixed black liquor downstream of the centrifugal separator 23b, 23 is chosen such that the percentage of tall oil products in the soap is from 50 to 70%, preferably approximately 60 wt. %.

Separated black liquor or mixed black liquor fractions 28 from the outlet 23c of the centrifugal separator "CS" is fed to the added mixed black liquor 5a, alternatively directly to the lower portion of the separation tank "SE".

It can be assumed that the tall oil products gathered by flotation in the top portion of the separation tank will assume a structured layering with a higher concentration of tall oil products at the top and a successively lower concentration of tall oil products thereunder.

It is the intention of the invention to drive the compression of solid compressed tall oil products downstream of the centrifugal separator 23b, 23 as far as practically possible, in order to separate the tall oil products from mixed black liquor, even if it is not practically possible to allow the complete separation of tall oil products only.

FIGS. 1 to 3 show the presence of several pumping units on selected conduits, however with no position numbers.

The conduit 23 does not, however, comprise a physical pumping unit.

However, it should be noted that it is of course possible, within the limits of the invention, to also for this conduit 23 have a purpose built pumping unit, designed and dimensioned for being able to pump and move very viscous material, between the outlet of the centrifugal separator "CS" to the inlet of the water mixer "VB".

Within the invention is also the insight that the material fed from the outlet 23b of the centrifugal separator shall have such a high concentration of solid tall oil products that is practically possible.

Furthermore, FIGS. 1 to 3 show conduits 5 that transport weak black liquor or black liquor with 14-15% TS and tall oil products and a conduit 5a for mixed black liquor with 23% TS and tall oil products.

The conduit 7 allows the transport of intermediate black liquor.

FIGS. 2 and 3 show a number of conduits 10, 10a that transport mixed black liquor to an evaporator "I", alternatively black liquor to waste liquor.

The volume of added water in the water mixer "VB" shall be as small as possible, however enough to let the solid material 23 to obtain a mousse or slurry form that can be pumped.

This small amount of water passes through the homogenization tank "H" and will be mixed with the added acid in the digestion facility "SP".

The design of the displacement pump can be chosen to be an ordinary displacement pump with a rotor and a stator, alternatively an equivalent displacement pump such as a gear pump, a lobe pump or similar.

The invention is not limited to the embodiment given as an example above, but can be modified within the spirit of the invention as defined in the claims.

In particular it should be noted that each shown unit and or circuit can be combined with every other unit and/or circuit within the limit in order to achieve the technical effect.

The invention claimed is:

1. A method for the separation of tall oil products from a black liquor, comprising:
    draining off boiling liquid that has been produced in a kraft mill chip digester, where said boiling liquid comprises a fibrous cellulose material in a mixture with said black liquor and tall oil products;
    mechanically separating the boiling liquid in a separation unit for the production of the fibrous cellulose material and the mixture of black liquor and tall oil products;
    adapting the mixture of black liquor and tall oil products to a mixed black liquor by addition of intermediate black liquor;
    bringing the mixed black liquor to a gravity separation tank, adapted for being emptied of collected and concentrated tall oil products in a discontinuous manner;
    floating said tall oil products to become positioned above and resting on a fraction of the mixed black liquor;
    bringing said concentrated tall oil products from the separation tank to a mixing tank for mixing;
    pumping said concentrated tall oil products from the mixing tank, through a pumping unit, to a centrifuge separator;
    bringing the concentrated tall oil products and the mixed black liquor contained to an inlet of said centrifugal separator; and
    said centrifugal separator generating centrifugal forces, allowing concentration of the tall oil products to a solid structure,
    wherein the solid structure has a solid form that is too hard to be pumped in a simple manner, the solid form is adapted to be diluted with water to the extent that it can be pumped, the thus diluted tall oil products are pumped to a tank.

2. The method according to claim 1, further comprising homogenizing the diluted tall oil products in the tank.

3. The method according to claim 1, further comprising the separation tank, by addition of mixed black liquor, elevating concentrated tall oil products, which by said elevation flows through a skimmer to the mixing tank before, through a pumping unit, being pumped to the centrifuge separator.

4. The method according to claim 2, further comprising feeding the tall oil products separated from mixed black liquor, to a digestion facility which, through addition of an acid at a pH of approximately 3.5, forming raw tall oil and acid water, lignin and salts as rest products.

5. The method according to claim 2, further comprising choosing a proportion of raw tall oil of 50 to 70 wt %, as a mixture of the tall oil products and mixed black liquor downstream of the centrifugal separator.

6. The method according to claim 5, further comprising feeding separated mixed black liquor fractions from the centrifugal separator to the added mixture of mixed black liquor with tall oil products, or directly to a lower portion of the separation tank.

7. An apparatus for separation of tall oil products from a black liquor containing boiling liquid produced within a kraft mill chip digester, where said boiling liquid comprises a fibrous cellulose material in a mixture with said black liquor and tall oil products, adapted to a mixed black liquor by the addition of intermediate black liquor, where the arrangement comprises:
   a separation unit adapted to mechanically separate the boiling liquid from the fibrous cellulose material;
   a gravity separation tank adapted for being emptied of the tall oil products collected and concentrated therein in a discontinuous manner, said tall oil products being floated on top of and above a fraction of mixed black liquor;
   a mixing tank adapted to receive said concentrated tall oil products from the gravity separation tank;
   a centrifugal separator arranged to be fed with and further concentrate said concentrated tall oil products, and where the centrifugal separator is arranged to, through the generation of centrifugal forces, separate and further concentrate the tall oil products to such an extent that the tall oil products are available in a solid and hard structure, wherein the solid structure has a solid form which is too hard to be pumped in a simple manner;
   a mixer adapted to dilute the solid form with water so that it becomes possible to pump; and
   a pump arranged to pump the thus diluted tall oil products to a tank.

8. The apparatus according to claim 7, wherein said tank is a homogenization tank.

9. The apparatus according to claim 7, wherein said pump is a displacement pump.

10. The apparatus according to claim 8, wherein said tank is arranged to supply tall oil products, partly separated from mixed black liquor, to a digestion facility in the arrangement, which allows the formation of a raw tall oil and acid water, lignin and salts as rest products by the addition of an acid to a pH of 3.5.

11. The apparatus according to claim 7, wherein a mixture of tall oil and black liquor downstream of the centrifugal separator is chosen with a proportion of raw tall oil of 50 to 70 wt %.

12. The apparatus according to claim 11, wherein the centrifugal separator is arranged to feed separated fractions of mixed black liquor to the mixed black liquor in separation tank which comprises tall oil products, alternatively to the lower portion of the separation tank.

* * * * *